April 13, 1965  A. G. ANDERSON ETAL  3,177,899
MULTIPLE PORT ROTARY DISC VALVE
Filed July 30, 1962  4 Sheets-Sheet 1
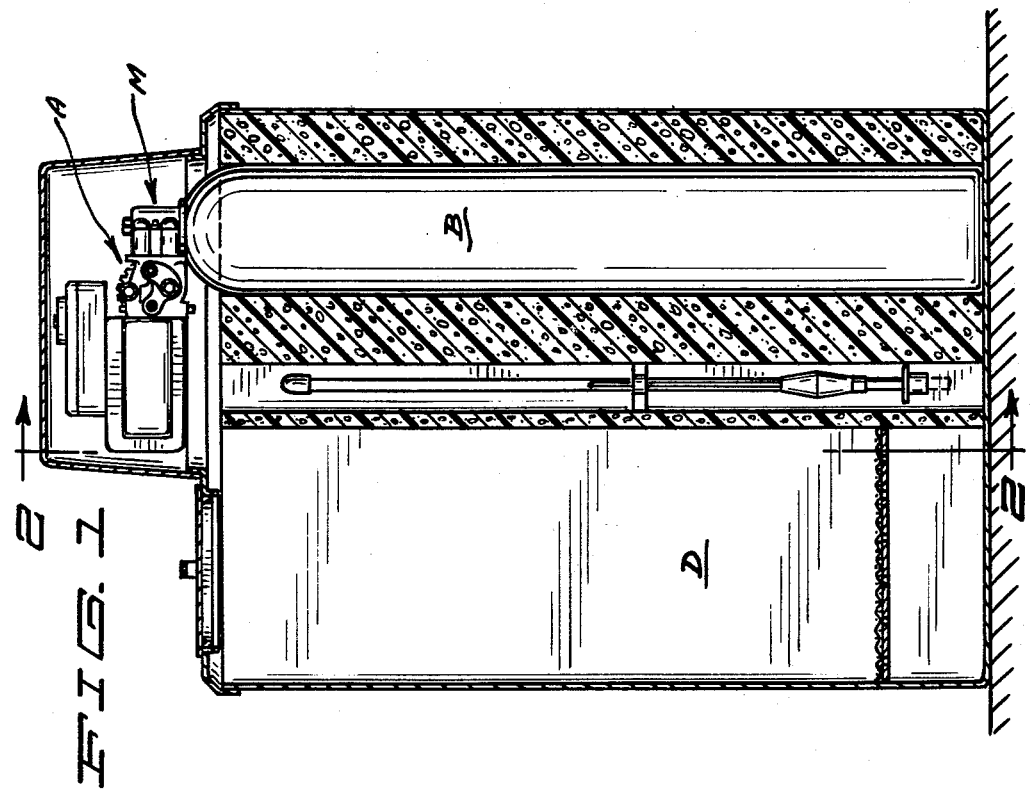
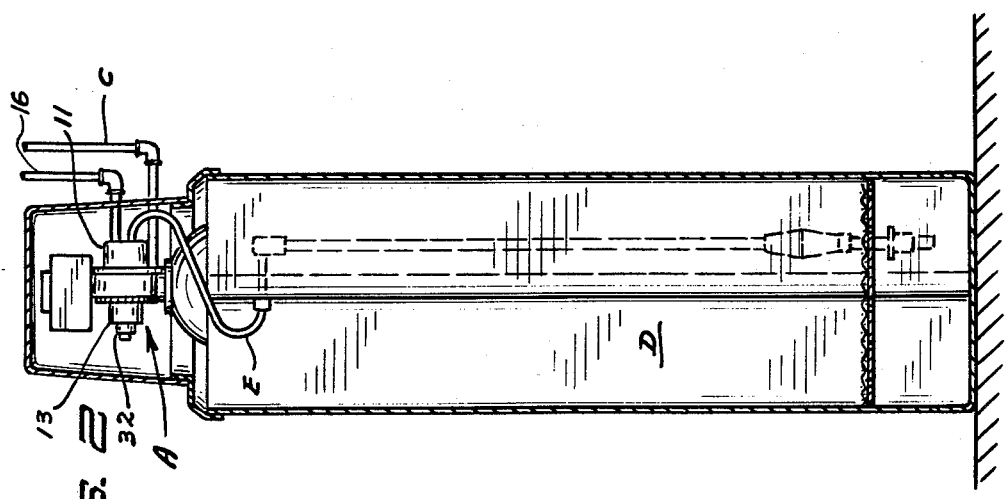
INVENTORS
ALBERT G. ANDERSON
BY LEO F. PERRY
GEORGE L. CONGDON
John W. Adams
ATTORNEY April 13, 1965 A. G. ANDERSON ETAL 3,177,899
MULTIPLE PORT ROTARY DISC VALVE
Filed July 30, 1962 4 Sheets-Sheet 2
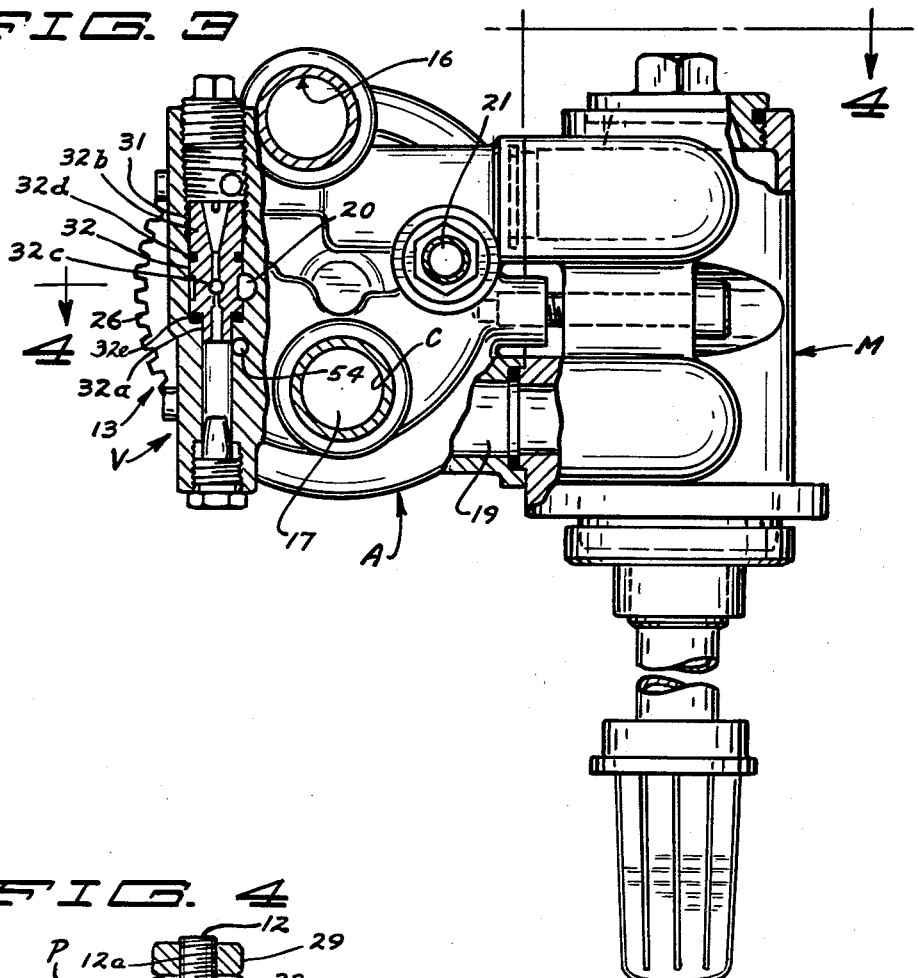
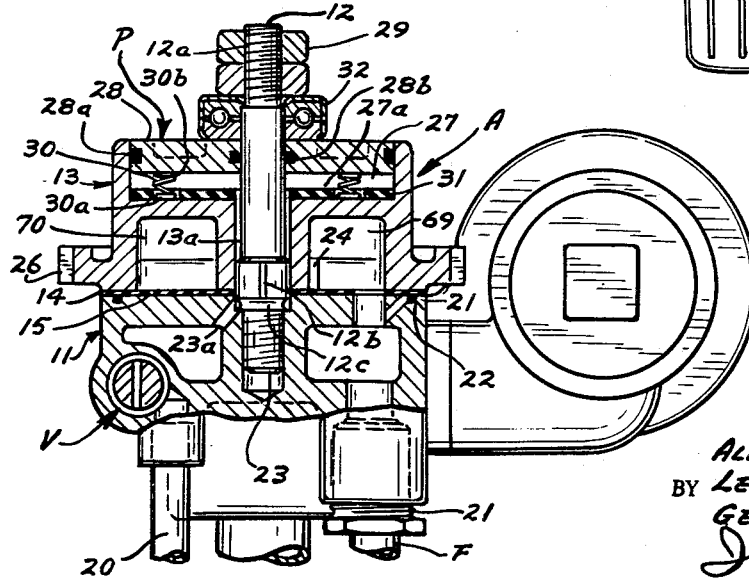
INVENTORS
ALBERT G. ANDERSON
BY LEO F. PERRY
GEORGE L. CONGDON
John W. Adams
ATTORNEY April 13, 1965   A. G. ANDERSON ETAL   3,177,899
MULTIPLE PORT ROTARY DISC VALVE
Filed July 30, 1962   4 Sheets-Sheet 3
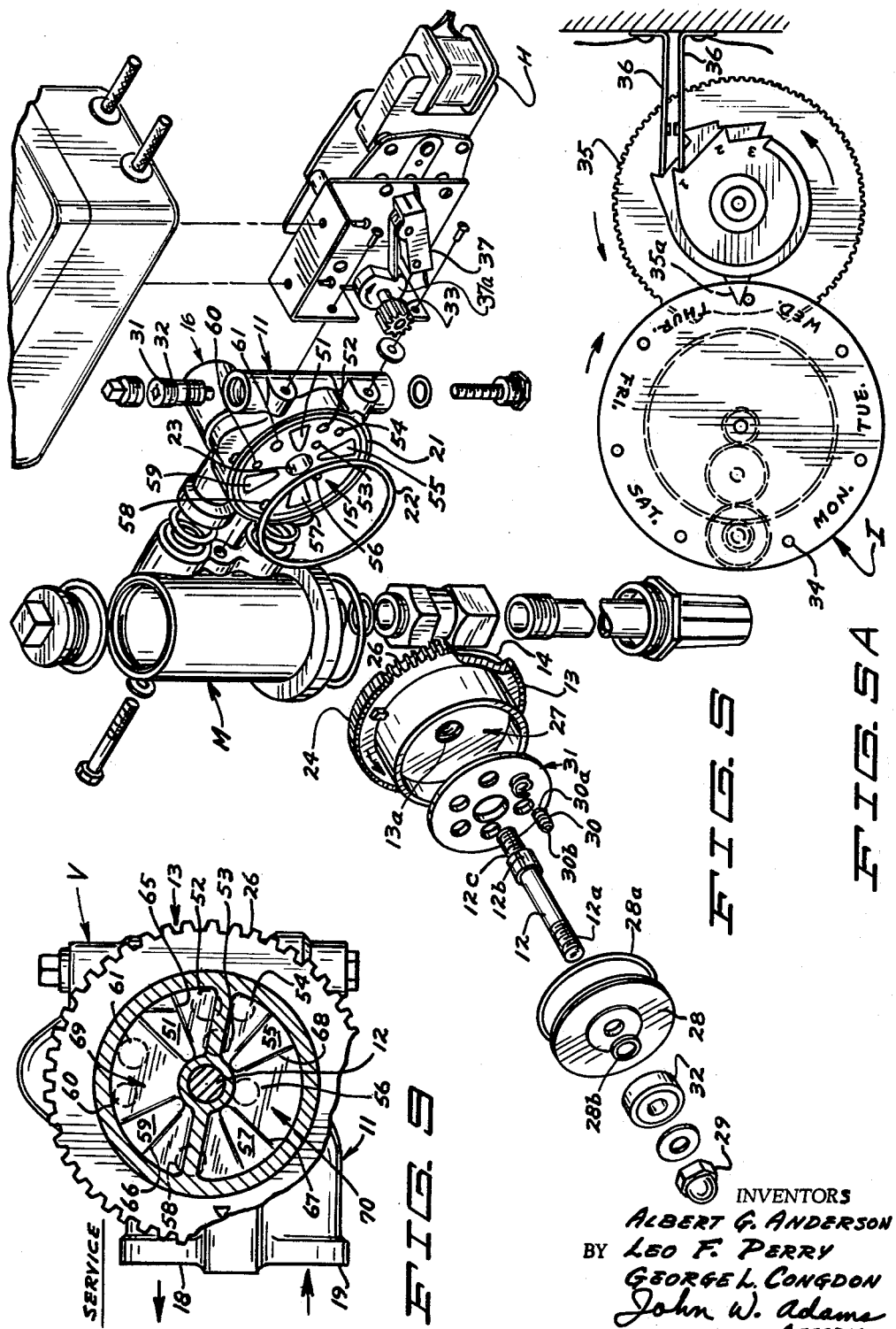
INVENTORS
ALBERT G. ANDERSON
BY LEO F. PERRY
GEORGE L. CONGDON
John W. Adams
ATTORNEY April 13, 1965    A. G. ANDERSON ETAL    3,177,899
MULTIPLE PORT ROTARY DISC VALVE
Filed July 30, 1962    4 Sheets-Sheet 4

INVENTORS
ALBERT G. ANDERSON
BY LEO F. PERRY
GEORGE L. CONGDON
John W. Adams
ATTORNEY United States Patent Office 3,177,899
Patented Apr. 13, 1965

3,177,899
MULTIPLE PORT ROTARY DISC VALVE
Albert G. Anderson, Cambridge, and Leo F. Perry and George L. Congdon, Fort Atkinson, Wis., assignors, by mesne assignments, to The Meadowbrook Company, a corporation of Minnesota
Filed July 30, 1962, Ser. No. 213,512
8 Claims. (Cl. 137—625.29)

This invention relates generally to multiple port liquid valves and particularly to a rotary disc type valve particularly adapted to be shifted into a plurality of positions.

It has always been a problem to produce an efficient, durable and liquid-tight multi-port valve. Piston or diaphragm actuated lift turn plate valves have been frequently used because a relatively soft easily sealed gasket material can be employed which will produce effective liquid-tight seal between the respective ports without requiring extremely accurate machining of the ports. The problem created by the soft gasket material is that the valve plate must be lifted before it can be turned in order to avoid damaging the gasket. Such lift turn plate valves permit solid particles to become lodged between the valve elements and the snap impact produced each time the valve reseats produces undue wear on the actuating mechanism and the valve elements themselves. Also, each time the valve reseats, it assumes a slightly different position and thereafter eventually leaks will occur. Obviously, the mechanism required to operate a lift turn plate valve is relatively complicated and requires an excessive amount of power particularly for actuation of the valve against water pressures commonly used in present day water supply systems.

Non-lift type rotary plate multi-port valves, on the other hand, have created other problems. Obviously, the sealing material interposed between the valve faces must be sufficiently hard to permit relative shifting movement between the valve elements without damaging such material and obviously excessive friction between the valve elements would make actuation thereof difficult. Also, if a seal is constantly maintained between the multi-port valve elements, dirt and solid particles cannot become interposed between the elements, avoiding scoring and subsequent leakage of the valve.

It is, therefore, an object of this invention to provide a multi-port valve wherein the valve elements are maintained in face-to-face sealed engagement throughout the entire operation thereof and wherein a sealing material is provided between the seated multi-port valve elements which will not only provide a positive and long-lasting seal but which will also provide low friction contact between the valve elements to facilitate shifting thereof from one position to another with a minimum of actuating power, thus greatly facilitating automatic operation thereof.

It is another object of this invention to provide a valve of the type described specifically designed to produce a constant pre-determined face-to-face sealing pressure between the valve elements regardless of the pressure of the supply water.

It is a further object to provide a multi-port valve particularly adapted for actuating by a timed mechanism to successively shift one of the valve elements through a plurality of different positions whereby the various steps of operation required for re-generating a water softener bed may be automatically performed.

It is another object to provide a multi-port rotary disc type valve including a stationary valve element and a rotary valve element disposed in sealed face-to-face relation with the rotary valve element mounted for rotation on an axially disposed spindle and provided with a circumferential driving mechanism disposed adjacent the plane defined by the engaged faces of the valve elements with means for periodically actuating said circumferential driving element.

It is a further object of this invention to provide a valve that will produce only a relatively slight pressure drop in the liquid flowing therethrough.

These and other objects and advantages of this invention will more fully appear from the following description made in connection with the accompanying drawings, wherein like reference characters refer to the same or similar parts throughout the several views, and in which:

FIG. 1 is a vertical sectional assembly view of our new valve as incorporated in a water softener system;

FIG. 2 is a vertical sectional view taken substantially along the line 2—2 of FIG. 1;

FIG. 3 is a front view partially in section showing the new valve embodying this invention;

FIG. 4 is a horizontal sectional view taken substantially along the broken line 4—4 of FIG. 3;

FIG. 5 is an exploded perspective view showing the parts of the new multi-port valve embodying this invention and showing the actuating timer therefor;

FIG. 5A is a diagrammatic view of the timer mechanism;

Figure 6:
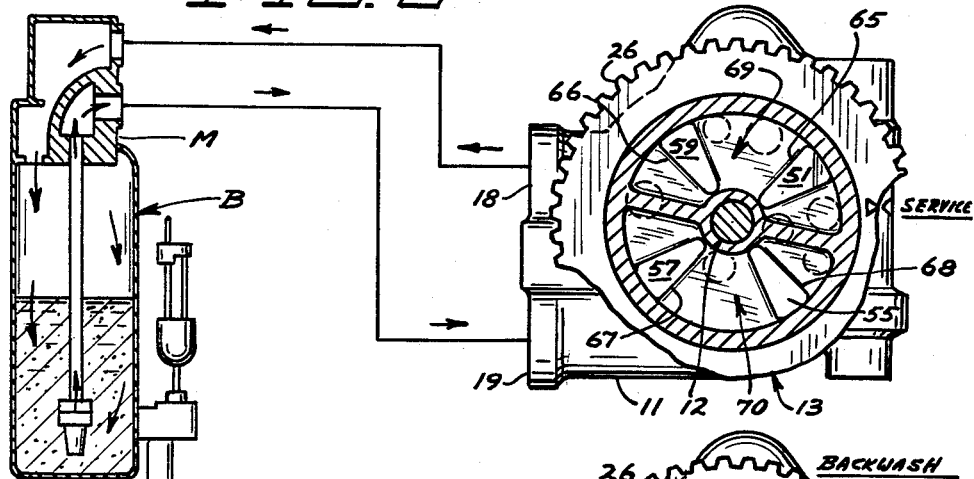
Figure 7:
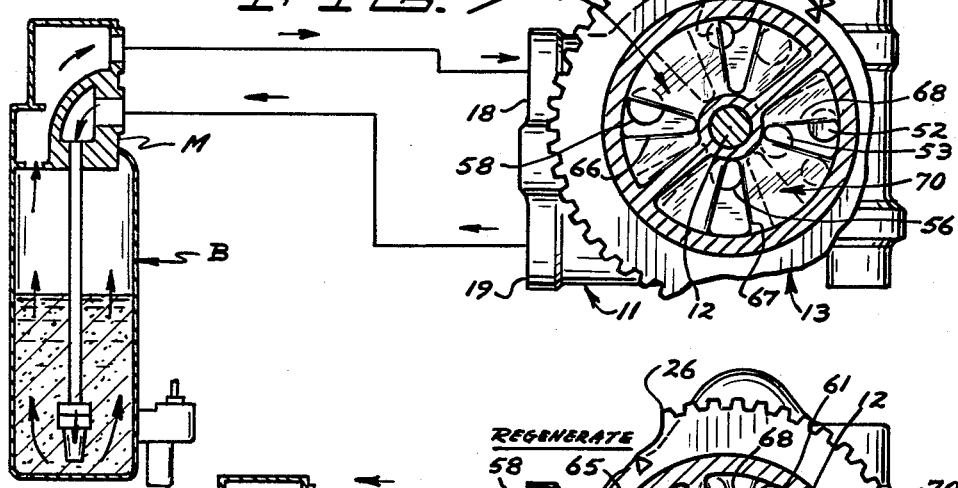
Figure 8:
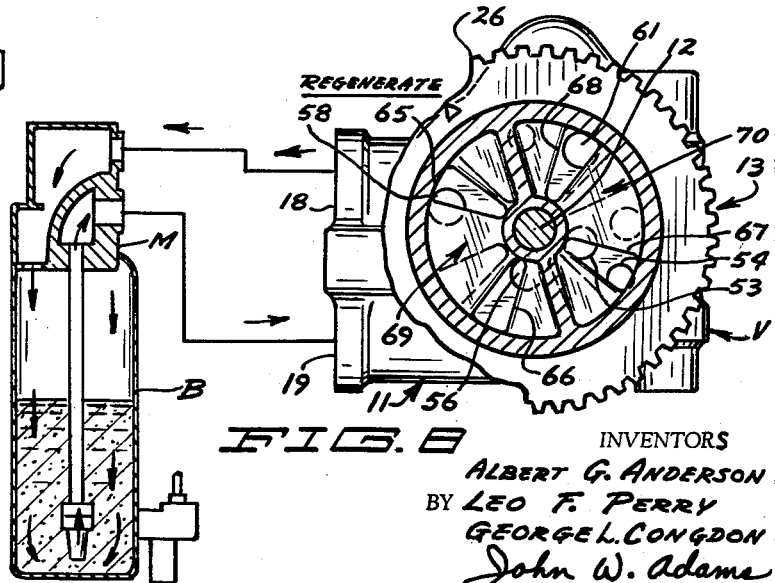

FIGS. 6, 7 and 8 are diagrammatic views respectively showing the service, backwash and re-generating cycles with the rotary valve element being shown in horizontal section and the softener being shown in vertical section, with the direction of liquid flow being shown by arrows in the respective views; and FIG. 9 is a horizontal sectional view showing the valve rotor in service position with the direction of flow into and out of the valve being shown by arrows.

A pressure type water softening system incorporating our automatically operated valve is diagrammatically illustrated. The main valve unit is generally designated by the letter A. The valve unit A consists of a stationary multi-port valve element 11 which, in the form shown, has a central spindle 12 with a rotary fluid controlling valve element 13 journalled for rotation thereon. A sealing and friction-reducing element 14 is in the form shown fixedly attached to the valve face of said rotary element 13 between the rotary element 13 and the stationary element 11. A balancing mechanism P is provided and includes a pressure chamber 27 which is designed to produce a uniform predetermined face-to-face pressure between the valve elements 11 and 13.

The stationary element 11 has, in the form shown, a generally planar valve seat or face 15 with a plurality of various sized ports or openings arranged circumferentially therearound and extending therethrough, the operation of which will be explained subsequently herein in more detail. Said openings respectively communicate with the passages and conduits 16, 17, 18, 19, 20 and 21 arranged on the exterior thereof for connection with the softener system illustrated. A source of liquid under pressure is supplied through conduit 16 and a second outlet 17 is connected to a soft water service conduit C. A pair of openings 18 and 19 are provided therein for connection to the softener unit B as by the manifold M. An opening of substantially smaller size 20 is provided for connection to the brine system D as by conduit E for the withdrawal of brine therefrom for re-generation of the softener unit B. The drain 21 is provided for threadable connection to a general service drain as by the conduit F.

The stationary member 11 has, in the form shown, a generally planar valve seat 15 which has a groove 21 to contain a peripheral sealing member 22 to circumscribe the openings passing through said seat. In the form shown, the sealing member 22 comprises an O-ring of sufficient softness for compression thereof and sealing therewith but sufficiently durable to withstand rotation of the rotatable valve member 13 thereon. A central mounting aperture 23 is provided which in the form shown threadably receives said central spindle 12 and a passage 23a is circumferentially associated with said aperture 23 to communicate with the hard water connection 16 and allow the entering hard water to flow about said spindle 12.

In the form shown, a groove 12c is provided around the spindle 12 in communication with the radial passage 23a and said spindle has a longitudinally formed groove 12b communicating with the peripheral groove 12c which permits the water under line pressure to flow upwardly past the spindle into a balancing chamber 27 for purposes to be described hereafter.

A rotary valve element or disc 13 is centrally journaled for rotation about the center fixed spindle 12 and in the form shown is slidably mounted thereon. Suitable provision for permitting the water to pass upwardly of the spindle is made as by providing the upper section of the spindle 12 of reduced diameter so that the central opening 13a of the valve element 13 is spaced outwardly therefrom. Disc 13 has a generally flat backing surface of a similar planar shape to the valve seat 15 and forms the backing for a sealing and friction-reducing member 14 which is positively attached thereto as by an epoxy based adhesive, as will be subsequently described.

In the form shown, a disc-type sealing and lubricating member 14 is interposed between said rotary member 13 and stationary member 11 about the spindle shaft 12 as to completely encompass the valve faces 15 and 24 and is further fixedly attached to said rotary member 13 and is in contact with the O-ring 22 of the stationary member 11. A plurality of ports 65, 66, 67 and 68 pass through the valve face 24 and attached sealing member 14 and extend rearwardly to communicate in a pair of closed individual chambers 69 and 70 such that two of the ports communicate with one chamber. The ports 65–68 and chambers 69 and 70 divert and control the fluid received from the stationary member 11 and return this fluid to proper ports in this same member 11.

Though we have tried various sealing agents, we have found that a tetrafluorethylene resin commonly known as Teflon, 1/32 of an inch thick, will produce a seal having the necessary qualities required to seal and lubricate the mating surfaces of the valve members 15 and 24. Teflon is not only chemically inert as not to break down in a brine solution, but is of sufficient strength and durability, having a Durometer hardness of 50–60, to withstand repeated rotation of the valve. A unique attribute of Teflon greatly enhancing the valve operation is the fact that upon rotation, a portion of the Teflon apparently "rubs off" on the stationary valve surface 15 and serves to fill any voids in the surface which could otherwise cause leaks from this seal, and also decreases the frictional resistance to rotation of the valve element 13. Through various tests, we have found a coefficient of friction of approximately .04 between the rotating members to be necessary for ease of rotation under various operating conditions to which this valve is subjected. This value of the coefficient of friction is attained by use of this specified material, Teflon.

As generally known to the trade, Teflon is very difficult to attach to any material by other than mechanical means such as screws. In this invention, we have found by etching one side of the Teflon with an activated sodium solution and using an epoxy based adhesive as the bonding agent, a suitable bond sealing the Teflon to the rotary member 13 is established. After bonding, we lap the Teflon 14 and the mating stationary valve surface 15 to 3–5 light band flatness to insure mating over the entire cooperating surfaces.

To provide the necessary face-to-face pressure to seal the valve surfaces 15 and 24, we provide a pressure initiating chamber 27 having one end thereof 27a in association with the rotary member 13 to urge said member 13 and attached Teflon seal 14 along the shaft 12 against the O-ring 22 and valve surface 15 of the stationary member 11. The other end 28 of the chamber is longitudinally slidable along said spindle shaft 12 as to be slidably receivable into the hollow portion of the chamber 27 and slidably adjustable along the spindle 12, as by the nut 29 and threaded spindle portion 12a. Said slidable end further seals the outward end of the chamber 27 as by an O-ring 28a around the periphery thereof and a second sealing means such as another O-ring 28b in association with the spindle shaft 12.

In the form shown, fluid under pressure passes into the pressure chamber 27 around the spindle 12 through the central opening 13a of the rotary member 13. The area of the outward end 28 of the chamber 27 corresponds substantially to the area of the individual chambers 69 and 70 of the rotary member 13. As the outer end 28 of the chamber 27 is fixed to the spindle 12, fluid entering the chamber 27 will exert a pressure within the chamber and particularly against the rear 27a of the rotary member 13 forcibly urging the same forward against and balancing the pressure of fluid entering the chambers 69 and 70. This forward urging pressure tends to balance the pressure of fluid entering said chambers 69 and 70 which tends to urge the rotary member 13 and attached sealing member 14 outward from sealing engagement with the stationary member 11. This pressure balance allows only the use of an additional optimum sealing force which will seal the valve elements and produce a low friction contact between said elements. As can be concluded from such a unique pressure balance system, this optimum sealing force will remain constant regardless of supply line pressure.

In the form shown, this optimum sealing force is presented by a plurality of resilient members within the chambers such as the coil springs 30 arranged circumferentially around the spindle shaft 12 and positioned therein by a spacing member 31. One end of the coil springs 30a associates with the rear of the rotary member 13, with the other end 30b in close compressed relation to the slidable end 28 of the chamber 27. The force exerted by said spring members 30 is adjustable according to variations in their effective length attained by adjusting said slidable end 28 along the spindle shaft 12 as by a threadable adjustment member 29 on a threaded portion 12a of said spindle 12. This force, of course, is the optimum required sealing force to insure not only sealing of the valve members but also the low friction contact insuring ease of rotation of the members.

An abutting frictionless member such as a thrust bearing 32 is interposed between the slidable end 28 and the adjustment member 29 to allow relative rotation therebetween when the slidable member 28 rotates with the rotary valve member 13.

A means of rotation such as the ring gear 26 is fixedly attached to the outer periphery of said rotary member 13 in close spaced longitudinal relation to the valve seat 24 so any driving forces transmitted to this gear 26 will tend to rotate said member 13 about the spindle shaft 12 rather than transmit a bending force to the shaft which would tend to separate the two valve faces. Rotation takes place at a predetermined rate and to a predetermined arcuate location such that fluid entering the rotary member 13 from the stationary member 11 will be returned to a proper port in the stationary member 11.

A Venturi system V is provided in close association to the stationary member and is associated with the brine tank D for drawing brine therefrom by the openings 20 and conduit E. In the form shown, the venturi 32 consists of a one-piece member formed by combining the throat 32a and nozzle 32b sections. A diametric opening 32c passes through the venturi and forms the suction inlet by which a brine solution is drawn into the valve. An O-ring 32d is arranged around the venturi 32 downstream from the brine inlet 32c to maintain the pressure differential present in the system. A gasket seal 32e is provided upstream of the brine inlet 32c. In the form shown, a threaded portion 31 around the nozzle end 32b of the venturi is provided for threadable engagement within the system V for location of the venturi suction inlet 32c in relation to the brine opening 20.

We further provide a suitable means for rotation of the rotary member 13 of our valve A and in the form shown, a pinion gear 33 intermeshes with the external ring gear 26 in a 6-to-1 ratio so that one turn of the pinion 33 will rotate the rotary member 13 ⅙ of a turn. In the water softener system one-half a turn of the ring gear 26 or three turns of the pinion 33 will comprise an entire cycle of service, backwash and regeneration. A suitable means such as electric motor H is provided to drive the pinion 33. A time clock I and cam system is adapted to energize the motor H and rotate the valve A at predetermined intervals for a predetermined time period to allow proper time for each operation of the cycle.

In the system shown, we provide an electric circuit comprising a clock 1 having a series of timer pins 34 located circumferentially thereon for actuation of an electrical switch system at certain predetermined times. When one of the timer pins 34 contacts a shifting member 35a on the usually motionless control cam 35, this cam 35 is shifted into continual rotating position. The control cam member 35 is designed to bring a pair of resilient electrical contacts 36 into and out of electrical engagement, thereby energizing the motor H. Rotation of the motor H and the pinion 33 associated therewith immediately closes a second roller cam controlled switch member 37 having a roller control cam 37a that will cause the same switch 37 to open after one revolution of said cam 37a. When this second roller cam controlled switch 37 is engaged, the movement of the control cam 35 allows the resilient contacts 36 to disengage and snap back to their original position. As stated, one turn of the pinion 33 rotates the valve A ⅙ of a revolution to a second, backwash, position. After a period of time, the now continually rotating control cam member 35 causes the resilient contacts 36 to a re-engage and inaugurate one more revolution of the pinion 33 and advances the valve A ⅙ of a revolution to a regeneration position, the resilient contacts 36 again return to their open position immediately upon said inauguration of rotation. This cycle is repeated to return the valve A to a service position and the control cam 35 to an unengaged position where they will remain until another predetermined time for such a cycle is reached.

As previously stated and as best shown in FIG. 5, the stationary valve member 11 has a plurality of spaced triangular shaped openings 51, 55, 57 and 59, a plurality of spaced circular openings 52, 53, 56, 58 and 61 and a pair of smaller openings 54 and 60 formed through the valve face 15. The openings are slightly beveled at their intersection with the valve surface to prevent interference with and gouging of the Teflon seal upon rotation. All of these openings communicate with one or several of the six admission and discharge openings on the exterior of said member, as will be shown. Further, the openings of the rotary valve member and Teflon seal match the triangular openings 51, 55, 57 and 59 of the stationary member and for illustration purposes, openings 65 and 66 communicate with chamber 69 and openings 67 and 68 with chamber 70.

In the form shown, the service flow treats generally hard raw water and permits the same to enter the house service line as softened water and is shown in FIG. 6. In this position, the openings 65–68 of the rotary member 13 are aligned respectively with 51, 59, 57 and 55 of the stationary member 11. Hard water enters inlet passage 16 and passes through port 51 through 65 into chamber 69 and out ports 66 and 59 where it enters the top port 18 of the manifold M of the softener unit B where it is treated while passing downward through the mineral bed there contained. It then enters a riser pipe and returns to the valve through the bottom port 19 of the manifold M. It then enters chamber 70 through ports 55 and 68 and passes from this chamber to the service outlet 17 by passing through ports 67 and 57 respectively.

FIG. 7 shows the valve in backwash position during which cycle the brine is washed out of the softening material in the softener by running water upward through said softener. During this cycle, only hard water is available for service to the user. Hard water entering the valve enters inlet chamber 70 through opening 52; a portion of this water also enters port 53, bypasses the softening process and enters the house service line C through opening 17. The water entering the chamber 70 crosses therein and passes through port 56 to the bottom port 19 of the manifold M downward into the riser pipe of the softener unit B where it is forced upward through the softening material washing out the foreign material or iron therein. The water then leaves the softener B and enters manifold M and valve A through opening 18 where it enters chamber 69 through ports 60 and 65 and crosses therein to exit through ports 66 and 58 where it enters the drain opening 21 and leaves the valve.

FIG. 8 shows the regeneration position wherein the softener unit B is recharged with a fresh brine solution from the brine tank. Hard water enters the valve at inlet 16 and passes into chamber 70 through ports 61 and 68. A portion of this water passes into port 53 which again is connected to the house service outlet 17 for pressure and supply during this time. The remainder of this water crosses to port 54 where it enters a Venturi system V. The action of the Venturi V causes fresh brine solution to be drawn from the brine tank D into the valve through the brine connection 20. The water and brine passes from the Venturi chamber into the top port 18 of the manifold M into the system B and passes through the mineral bed where the brine is deposited. The remaining water then flows into the riser tube and re-enters the valve at the bottom port 19 of the manifold M and enters chamber 69 through ports 56 and 66, and is discharged from the chamber 69 through ports 65 and 58 where it passes through the drain outlet 21.

After this cycle, the valve is then re-rotated to the service position as above described, where it remains until the time clock again actuates the controlling cam for another complete cycle.

It will be seen that we have provided a highly efficient valve in which we arrange a balance chamber communicating with the fluid entering from the supply line and using the pressure of said entering fluid to assist in sealing the valve against the separating force usually resulting from this supply line pressure, this balance of pressures alleviating any external sealing means other than an application of an optimum sealing force.

Further, we have provided a highly efficient valve unit adapted for periodic operation, by an electrical system controlled by a timer device, designed particularly for a water softening system to re-generate the system at periodic intervals. The valve is particularly adapted for use in a system that may present difficult sealing problems due to the medium conveyed, as the Teflon seal is chemically inert to most situations.

It will, of course, be understood that various changes may be made in the form, details, arrangement and proportion of parts without departing from the scope of our invention, which generally stated consists in the subject matter set forth in the appended claims.

What is claimed is:

1. A multiport rotary turn plate comprising a pair of valve elements, one constituting a stationary valve element having a planar face, a spindle fixed centrally thereto and extending normally thereof, a second rotary valve element journal on said spindle and disposed in face to face relation with the planar face of the stationary valve element and being arranged for longitudinal sliding movement along the spindle, a sealing and lubricating element positively adhered to one of said valve elements, a valve inlet for introducing fluid under inlet pressure between the valve elements to expose an area of the rotary valve element to inlet pressure in a manner tending to urge the valve members apart, said rotary element having fluid controlling passages therein and further having wall means opposite the face of the rotor which engages a stationary valve element, said wall means defining a chamber, a closure disc slidably and sealably mounted within the wall means and on the spindle to sealingly close the chamber, means carried by the spindle to limit the axial movement of the disc relative to the spindle so that the disc is prevented from moving out of sealing engagement with the chamber, resilient means between the rotary valve element and the disc urging the disc against the limit means and the rotary valve element against the planar face of the stationary valve element and means for supplying pressure fluid to the chamber from the inlet, the size of the said closure disc being substantially equal in area to the total area against which the supply liquid acts within the fluid controlling passages of the rotary valve element, to substantially balance out the separating force exerted thereby, and said resilient means urging said rotary valve element into engagement with said stationary valve element with the desired optimum force to maintain the sealed relation therebetween as well as the desired frictional resistance to rotation of the rotary valve element thereof.

2. The structure set forth in claim 1 and a seal member arranged in the other of said valve elements engaging only the periphery of said sealing and lubricating element.

3. A multiport rotary turn plate comprising a pair of valve elements, one constituting a stationary valve element having a planar face, a spindle fixed centrally thereto and extending normally thereof, a second rotary valve element journal on said spindle and disposed in face to face relation with the planar face of the stationary valve element and being arranged for longitudinal sliding movement along the spindle, a valve inlet for introducing fluid under inlet pressure between the valve elements to expose an area of the rotary valve element to inlet pressure in a manner tending to urge the valve members apart, said rotary element having fluid controlling passages therein and further having a wall means opposite the face of the rotor which engages a stationary valve element, said wall means defining a chamber, a closure disc slidably and sealably mounted within the wall means and on the spindle to sealingly close the chamber, means carried by the spindle to limit the axial movement of the disc relative to the spindle so that the disc is prevented from moving out of sealing engagement with the chamber, resilient means between the rotary valve element and the disc urging the disc against the limit means and the rotary valve element against the planar face of the stationary valve element and means for supplying pressure fluid to the chamber from the inlet, the size of the said closure disc being substantially equal in area to the total area against which the supply liquid acts within the fluid controlling passages of the rotary valve element, to substantially balance out the separating force exerted thereby, and said resilient means urging said rotary valve element into engagement with said stationary valve element with the desired optimum force to maintain the sealed relation therebetween as well as the desired frictional resistance to rotation of the rotary valve element thereof.

4. The structure set forth in claim 3 wherein the means for supplying pressure fluid to the chamber includes a longitudinal passage defined by said spindle which passage communicates on one end with said inlet and on the other end with said chamber.

5. Structure set forth in claim 3 wherein said resilient means between the rotary valve element and the disc includes a plurality of circumferentially spaced spring members having the respective ends thereof engaged to the rotary element and the disc with means for maintaining the circumferential spacing of the spring members.

6. A multiport rotary turn plate valve comprising a pair of cooperating valve elements, one constituting a stationary seat element, a spindle centrally fixed thereto and extending normally thereof, the other including a rotary element having a plurality of ports communicating with at least a pair of connecting passages therein, said rotary element being journaled on said central spindle, a valve inlet for introducing fluid under inlet pressure into the connecting passages of said rotary element in a manner which tends to urge the valving members apart, said rotary element having wall means opposite the face of the rotor which engages a stationary valve element, said wall means defining a chamber, a closure disc slidably and sealably mounted within the wall means and on the spindle to sealingly close the chamber, means carried by the spindle to limit the axial movement of the disc relative to the spindle so that the disc is prevented from moving out of sealing engagement with the chamber, resilient means between the rotary valve element and the disc urging the disc against the limit means and the rotary valve element against the planar face of the stationary valve element and means for supplying pressure fluid to the chamber from the inlet, the size of the said closure disc being substantially equal in area to the total area against which the supply liquid acts within the fluid controlling passages of the rotary valve element, to substantially balance out the separating force exerted thereby, and said resilient means urging said rotary valve element into engagement with said stationary valve element with the desired optimum force to maintain the sealed relation therebetween as well as the desired frictional resistance to rotation of the rotary valve element thereof.

7. The structure set forth in claim 6 wherein said disc is adjustably mounted on said spindle to vary the pressure of said resilient means.

8. The structure set forth in claim 6 wherein said sealing and lubricating member consists of a material for a Durometer hardness of 50–60 and which will produce a coefficient of friction of approximately .04.

References Cited by the Examiner
UNITED STATES PATENTS

| | | | |
|---|---|---|---|
| 905,605 | 12/08 | Tarn | 137—625.21 |
| 2,631,811 | 3/53 | Malloy | 137—625.31 XR |
| 2,745,434 | 5/56 | Stevenson | 251—283 XR |
| 2,911,008 | 11/59 | Du Bois | 137—625.31 |
| 2,990,853 | 7/61 | Sharp | 137—625.46 XR |
| 3,014,489 | 12/61 | Lamp | 137—625.31 XR |
| 3,040,777 | 6/62 | Carson | 137—625.46 |
| 3,074,431 | 1/63 | Schwartz | 137—624.18 |

WILLIAM F. O'DEA, *Primary Examiner.*

ISADOR WEIL, *Examiner.*